3,109,342
PLASTIC COLLAPSIBLE SCREW FASTENING DEVICE HAVING AUXILIARY HOLDING MEANS
Aubrey Disley, Knowle, England, assignor to George Goodman Limited, Birmingham, Warwick, England, a British company
Filed May 20, 1960, Ser. No. 30,503
Claims priority, application Great Britain June 25, 1959
2 Claims. (Cl. 85—40)

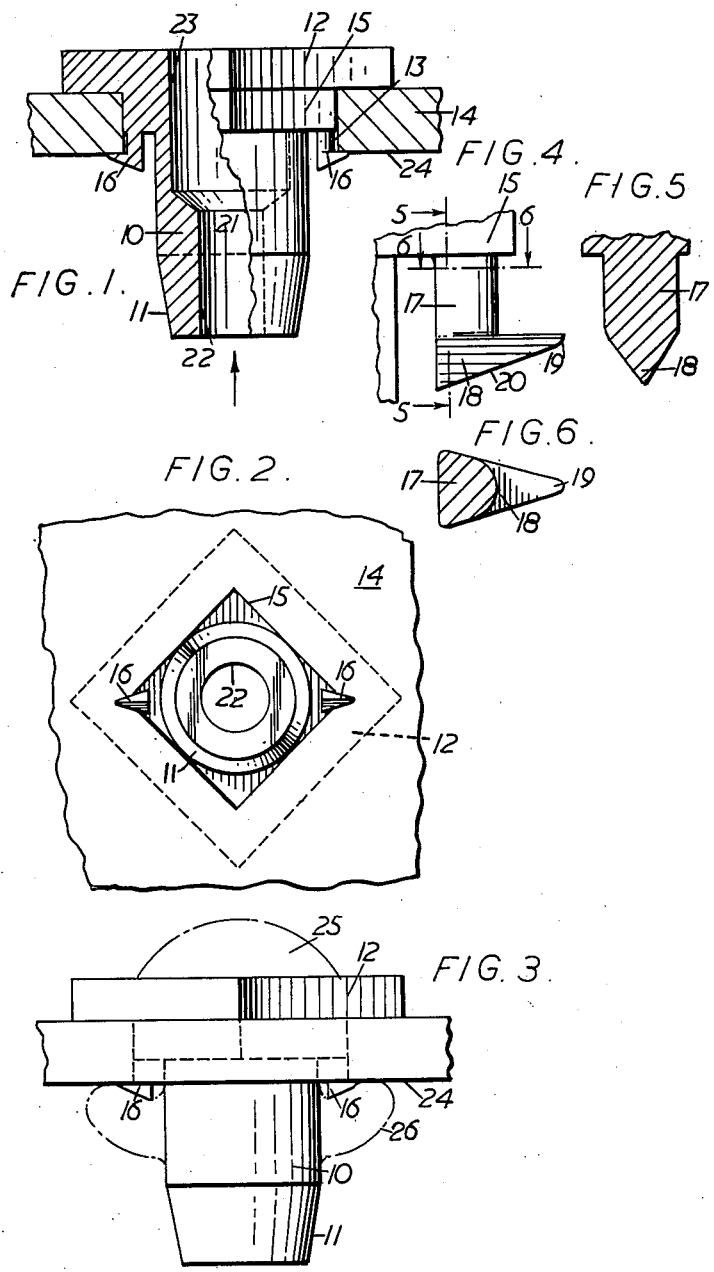

This invention relates to a screw fastening device of the kind comprising a sleeve adapted to be mounted in a prepared hole in the member to which the fastening device is to be applied, said sleeve having an enlarged head at one end and being so formed that when a screw is driven into the sleeve from this end, the wall of the sleeve which is on the side of said member remote from the head, is caused to bulge outwardly so that ultimately the sleeve is firmly anchored in the said member. Such screw fastening devices are hereinafter referred to as being "of the kind specified."

Hitherto in this known kind of fastening device the sleeve made of metal has been cylindrical throughout and when being used, the head is held by a tool whilst the screw is being driven to prevent rotation of the sleeve and to prevent the sleeve from being drawn out of the said member due to the axial pull which exists when the wall of the sleeve is being bulged.

The object of the present invention is to provide an improved fastening device of this kind which will be simpler to install than the kind known hitherto and which also possesses other advantages as are referred to hereinafter.

According to the present invention, I provide a screw fastening device of the kind specified comprising a sleeve which is of generally cylindrical form over the major portion of its length and at one end has a flange projecting radially outwards, the external surface of the portion of the sleeve which is immediately adjacent this flange, being formed to a non-circular cross-section so that the sleeve can be mounted non-rotatably in a member having a hole of such shape as to engage non-rotatably with the said portion of the sleeve and with the underneath of the flange of the sleeve engaging the surface of the member surrounding said hole, and the sleeve being further provided with one or more projections on or adjacent said portion of non-circular cross-section and spaced away from said flange, which projections are adapted to engage with said member when the sleeve is mounted in position to prevent the sleeve from being withdrawn.

Preferably the projections are so formed and located on the sleeve that, when the sleeve is inserted, they engage the surface of the member remote from the flanged end of the sleeve.

The member above referred to may, for example, be a single sheet or plate to which something is to be attached by means of a screw and a sleeve in accordance with the invention, or in another case the member may be two or more sheets which are to be secured together and the fastening device of the present invention is particularly advantageous in cases where one side of the said member is inaccessible. Hence the fastening device of the present invention is particularly useful as a "blind side" fastener.

I prefer to make the sleeve from a synthetic resinous material such, for example, as a suitable form of nylon as this enables the sleeve to be easily and economically produced by a die-casting operation and provides a sleeve wall which is readily bulged when a screw is applied and also in this material the aforesaid projections on the sleeve can be readily "sprung" through the opening in the member to which the sleeve is applied and being resilient will recover their shape and provide the locking function on the blind side of the member.

Further advantages arising from producing the sleeve from synthetic resinous material are that, firstly, it provides a fastening with sound deadening properties which is useful in cases where vibration is encountered and secondly it can be used in cases where electrical insulation properties are required and after installation of the sleeve the screw used may be removed leaving a fixed insulating sleeve passing through a partition.

Conveniently the non-circular portion adjacent the flange on the sleeve is of square form and also to facilitate the use of the sleeve, the flange may also be of square form with its sides parallel to the sides of the other square so that when this flange is held in the hand, the square portion of the sleeve can be readily orientated for installation into a corresponding square hole provided in the sheet, plate, or other member to which it is to be applied.

The internal passage in the sleeve may, if desired, be provided with a screw thread but I prefer to leave a plain passage as this enables less expensive production and when the sleeve is made in synthetic resinous material a screw can easily cut its own thread when applied.

The invention is illustrated in one embodiment in the accompanying drawings wherein:

FIGURE 1 is a section through the sleeve shown inserted in a hole and prior to the application of a screw.

FIGURE 2 is an underneath plan view on FIGURE 1.

FIGURE 3 is a view similar to FIGURE 1 but illustrating the deformation of the sleeve when a screw is applied.

FIGURE 4 is an enlarged fragmentary view of one of the projections.

FIGURE 5 is a section on the line 5—5 of FIGURE 4, and,

FIGURE 6 is a section on the line 6—6 of FIGURE 4.

In the embodiment of the invention shown in the drawings, the sleeve 10 is made from a suitable grade of nylon and over the major portion of its length is of generally cylindrical formation with a slight taper provided on the external surface at the end 11 of the sleeve remote from the flange 12 so as to provide a lead-in portion to assist in rapid installation of such sleeve into its prepared hole 13 in the member 14 to which it is applied. At the other end, the sleeve has the outwardly projecting flange 12 which is of square form and immediately adjacent this flange the external surface 15 of the sleeve, for a short portion of its length, is formed to square cross-section, the sides of this square 15 being parallel to the corresponding sides of the flange 12.

The square portion 15 of the sleeve is provided with two projections indicated at 16 in FIGURES 1–3 and shown in enlarged detail in FIGURES 4–6.

As seen best in FIGURE 2, the projections 16 are situated at opposite corners of the square 15, and (referring to FIGURES 4–6) each projection comprises a stem 17 extending from the underneath face of the square 15 in a direction parallel to the axis of the sleeve and a nose 18 projecting outwardly in a direction which is radial to the axis of the sleeve.

It will be observed that the stem 17 is spaced outwardly away from the outer wall of the sleeve and that the tip 19 of the nose 18 projects outwardly a greater distance from the axis of the sleeve than the corner of the square portion 15. Thus the distance between the two tips 19 of the projections, is greater than the diagonal measurement of the hole 13 in the member 14.

The underside surface 20 of each nose 18 is inclined at an acute angle to the axis of the sleeve so that these two surfaces 20 are mutually convergent in the direction towards the entry end 11 of the sleeve. Further, as seen in FIGURE 6, each nose 18 is of triangular shape with its apex forming the tip 19.

The passage 21 extending through the sleeve is of two diameters, the smaller diameter portion 22 extending from the tapered end 11 of the sleeve inwardly for about half its axial length and then the passage widens into a counterbore portion 23 of larger diameter which extends through to the flanged end of the sleeve.

In use, the square hole 13 is provided in the plate, sheet, or other member 14 to which the fastening is to be applied, this hole having dimensions to correspond to the square portion 15 on the surface of the sleeve and then the sleeve is pushed through the hole so that the projections 16 on the sleeve are deflected inwardly in passing through the hole 13 in the member 14 and then regain their original form and the noses 18 engage the surface 24 of the member 14 remote from the flange of the sleeve so that when in position the square portion 15 of the sleeve is engaged in the square hole 13 in the member and the sleeve is prevented from being withdrawn by virtue of the noses of the projections engaging the member 14.

When a screw 25 is applied it cuts its own thread in the smaller diameter portion 22 through the passage of the sleeve and after the head of the screw has made engagement with the flange 12 of the sleeve, further rotation of the screw will draw the tapered end 11 of the sleeve towards the flanged end causing the wall of the sleeve to bulge outwardly (see FIGURE 3) and finally reaching a position where the outwardly bulged wall 26 makes contact with the surface 24 of the member 14 remote from the flange, thus locking the sleeve firmly in position.

The projections 16 on the sleeve prevent any tendency for the sleeve to withdraw during this operation and rotation of the sleeve is prevented by virtue of its square portion 15 engaging in the square hole 13 in the member 14 so that no special tool is required for applying the fastening and a conventional form of screw-driver may be used.

Further the screw may be taken out of the sleeve and reinserted as desired without loss of efficiency of the fastening.

The disposition of the projections 16 at the opposed corners of the square 15 has the added advantage that it assists in the initial insertion of the sleeve as it is found that as the sleeve is pushed into the hole 13 and given a slight angular movement the projections 16 will locate themselves at the corners of the square hole and thus greatly facilitate the operation of lining up the square portion 15 with the square hole 13. The sloping surfaces 18 give a lead-in to assist the projections in entering the hole 13.

The form of projections 16 shown in the drawings has a further advantage in practice because, although the length of the stem 17 of the projection is chosen to suit the thickness of sheet 14 with which it is to be used, the thickness may vary from place to place in one sheet and two sheets of supposedly the same guage may have different thicknesses due to manufacturing tolerances.

Where the sheet is undersize, the projections 16 will still engage behind the sheet and prevent the sleeve from coming out when the screw is being inserted. Where the sheet is oversize, the projections 16 may not pass right through the hole 13 and the noses 18 will be trapped inside the hole 13 instead of engaging the surface 24. However, due to the particular formation of the projections they will exert a grip upon the wall of the hole 13 and any tendency for the sleeve to withdraw, will only serve to increase this grip so that the projections still function to prevent withdrawal even though the sheet is oversize.

In the above described embodiment, the sleeve has a passage 21 which extends right through from end to end but in certain cases, for example where a liquid tight seal is required, it would be advantageous to provide the sleeve with a closed end so that it has a blind hole therein and when applied as a fastening in a manner as above described, the closed end of the sleeve would result in a complete seal being formed around the end of the screw remote from its head. Such an application would be of advantage when applying the fastening device to such things as containers containing corrosive fluid.

What I claim then is:

1. A screw fastening device comprising a sleeve of deformable material, said sleeve having an axial bore extending from one end at least partially to an end remote from the one end, said bore being enlarged in the region of the one end and of smaller diameter in the region of the remote end, a flange at the one end of the sleeve, a portion of non-circular cross section immediately below the flange for non-rotatable engagement in a similarly shaped hole in a member to which the fastening is applied, the maximum dimension of said portion of non-circular cross section being less than the minimum dimension of said flange, the remaining sleeve portion from the non-circular portion to the remote end of the sleeve being of circular cross section of less area than that of an end face of the non-circular portion adjacent the circular portion, the diameter of said circular sleeve portion being no greater than the minimum dimension of the non-circular portion, the circular sleeve portion wall immediately adjacent the non-circular portion being thin compared to the circular sleeve portion wall at the remote end, and a plurality of circumferentially spaced locking projections integral with the non-circular portion, each locking projection having a stem extending from said end face of the non-circular portion towards the remote end, the stem being parallel to the sleeve axis and spaced from the thin wall of the circular sleeve portion, and a nose projecting radially outwardly from the outer end of the stem beyond the periphery of the non-circular portion.

2. A screw fastening device comprising a sleeve of deformable material, said sleeve having an axial bore extending from one end at least partially to an end remote from the one end, said bore being enlarged in the region of the one end and of smaller diameter in the region of the remote end, a flange at the one end of the sleeve, a portion of square cross section immediately below the flange for non-rotatable engagement in a similarly shaped hole in a member to which the fastening is applied, the maximum dimension of said portion of square cross section being less than the minimum dimension of said flange, the remaining sleeve portion from the square portion to the remote end of the sleeve being of circular cross section of less area than that of an end face of the square portion adjacent the circular portion, the diameter of said circular sleeve portion being no greater than the minimum dimension of the non-circular portion, the circular sleeve portion wall immediately adjacent the square portion being thin compared to the circular sleeve portion wall at the remote end, and two locking projections integral with the square portion, one disposed in each of two opposed corners of the square portion, each locking projection having a stem extending from the square portion towards the remote end, the stem being parallel to the sleeve axis and spaced from the thin wall of the circular sleeve portion, and a nose projecting radially outwardly from the outer end of the stem beyond the periphery of the square portion, the face of the nose towards the remote end being inclined in respect to the sleeve axis and the inclined surfaces of the two noses converging towards said axis in a direction away from the flange.

(References on following page)

References Cited in the file of this patent

UNITED STATES PATENTS

| | | | |
|---|---|---|---|
| 2,181,966 | Dean | Dec. 5, | 1939 |
| 2,358,206 | Boersma | Sept. 12, | 1944 |
| 2,571,394 | Trafton | Oct. 16, | 1951 |
| 2,605,806 | Tinnerman | Aug. 5, | 1952 |
| 2,836,215 | Rapata | May 27, | 1958 |
| 2,887,926 | Edwards | May 29, | 1959 |
| 2,912,712 | Shamban et al. | Nov. 17, | 1959 |
| 2,946,612 | Ahlgren | July 26, | 1960 |
| 3,014,563 | Bratton | Dec. 26, | 1961 |
| 3,050,097 | Cochran | Aug. 21, | 1962 |